2,997,791
Patented Aug. 29, 1961

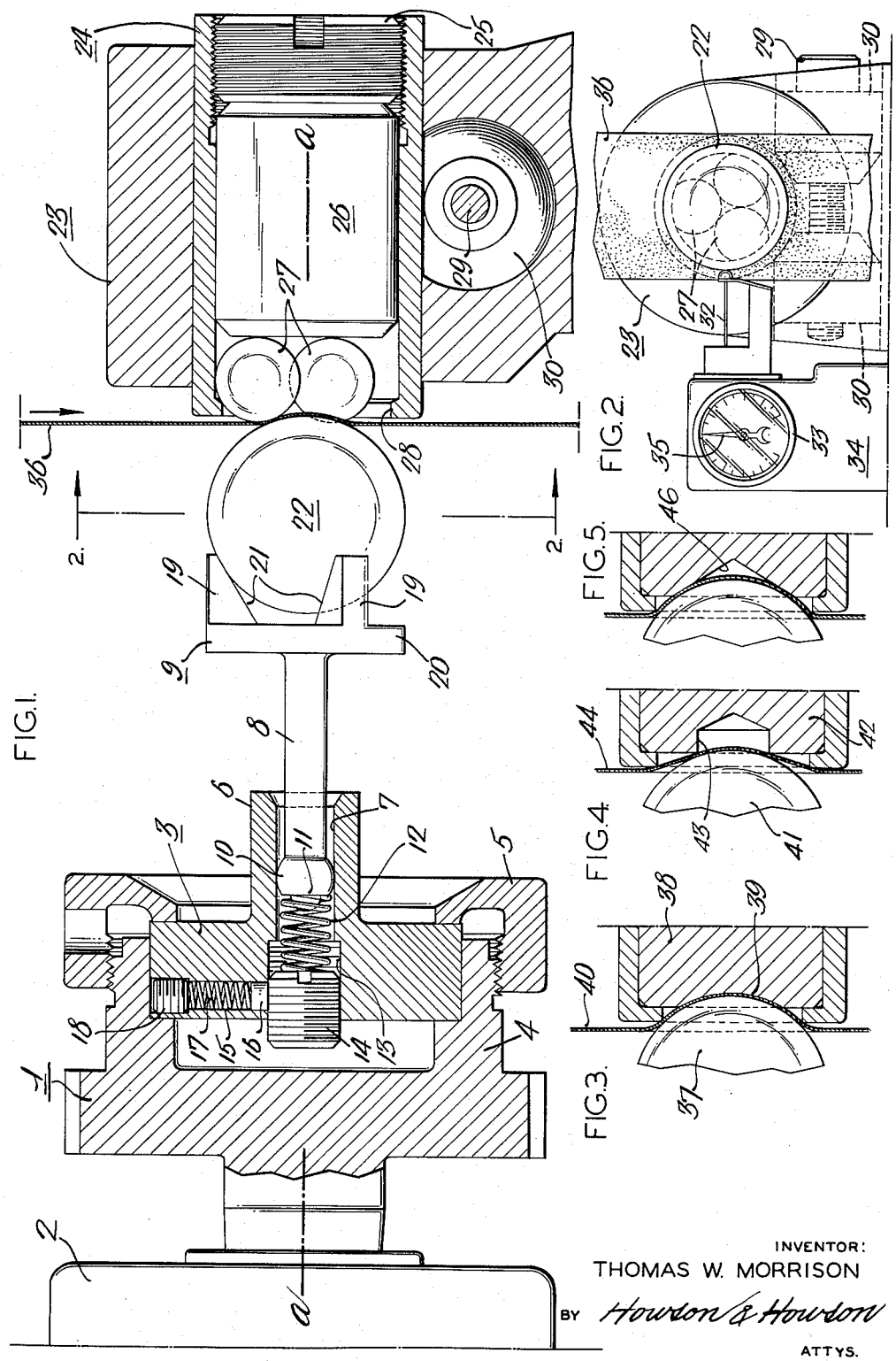

2,997,791
MOUNTING DEVICE THAT CENTRALIZES BALL WHILE TESTING ITS SURFACE FOR WAVINESS

Thomas W. Morrison, Jenkintown, Pa., assignor to SKF Industries, Inc., Philadelphia, Pa., a corporation of Delaware
Filed Aug. 18, 1958, Ser. No. 755,595
7 Claims. (Cl. 33—178)

This invention relates to devices for use in testing the spherical accuracy of balls, especially those used in the ball bearing industry.

For many years there have been gauges capable of measuring the diameters of balls for bearings within as little as .00001 of an inch, but until the present invention it has been impossible to measure their spherical accuracy with corresponding precision. It is known that the finished surfaces of such balls exhibit waviness which, when the element is tested in rotation against the needle point pickup of a sensitive electronic measuring device, shows on the meter dial of the device as deviations from a true circumference. Such instruments may possess sensitivity (amplification) as high as 10 million to one, and therefore are inherently capable of measuring slightest deviations. The machines in which the ball is rotated in contact with the pickup of the aforesaid instruments have not heretofore exhibited that degree of accuracy and freedom from extraneous discrepancies which would take full advantage of such instruments, because of the fact that the registered variations are a composite of inequalities of the spherical surface of the machine and of its bearings.

A principal object of the present invention is to provide a device for manipulating spherical elements for measurement of spherical accuracy of surface by the extremely sensitive electronic measuring devices now available, which will afford an accurate measurement of any departure from true sphericity in the surface of said elements. By having a means of accurately measuring the said waviness, both as to magnitude and frequency, it is possible to make adjustments to the ball producing machine and to determine when balls, having lowest wave heights, are being produced. Since the noise produced by ball bearings is a function of the wave height and the number of waves on the balls, it is also possible to select the balls with lowest waviness and to thereby produce the quietest running bearings.

A device made in accordance with the present invention is illustrated in the attached drawings, wherein:

FIG. 1 is a vertical sectional view showing the essential elements of the device of this invention.

FIG. 2 is a sectional view on the line 2—2, FIG. 1; and

FIGS. 3, 4 and 5 are fragmentary sectional views illustrating modifications within the scope of the invention.

With reference to the drawings, 1 is a chuck which is rotated by a motor 2 about the axis thru chuck, test ball 22, and tailstock 23 indicated at $a$—$a$. The chuck carries a generally cylindrical holder 3 which is held in place in the body 4 of the chuck by a cover 5 threaded on said body and solidly clamping the holder 3 in the latter. The holder has an extension 6 and an axial bore 7 in which is slidably mounted the stem 8 of a ball-engaging member 9. The stem has at its inner end a spherical enlargement 10 which is freely movable within the bore 7 and which has at its inner side a flat surface 11 which forms a seat for a spring 12 mounted in the bore 7. The inner end of the bore 7 is counterbored as indicated at 13 and is threaded for reception of an adjustable threaded abutment 14 which forms the other seat for spring 12. Thus the spring 12 is confined between the abutment and the inner end surface 11 of the stem 8, and the effective pressure of the spring against the stem may be regulated by adjustment of the abutment member. The member 3 also contains a bore 15 which intersects the threaded counterbore 13 and which contains at its inner end a cylindrical plug 16 which is held in forcible contact with the threaded surface of the abutment 14 by means of a spring 17 mounted in the bore 15, said spring being confined between the plug 16 and a set screw 18 threaded into the outer end of the bore. The spring pressed plug acts to anchor the set screw 14 in adjusted position. The details of the chuck form no part of the present invention and may be considered conventional.

The outer end 9 of the member 8 has three axially extended fingers 19 evenly spaced around the circumference of the head portion 20 and having their inner faces tapered as indicated at 21 so as to form together a recessed conical seat for the test ball indicated at 22. At its opposite side the ball 22 is supported on a fixed seat formed in the tailstock 23. This tailstock carries a sleeve 24 which is coaxial with the chuck 1 on the axis $a$—$a$. The end of the sleeve 24 relatively remote from the sphere 22 is threaded for reception of a correspondingly threaded plug 25, the inner end of which forms an abutment for a cylindrical member 26 slidably fitted in the sleeve 24. At its opposite end the cylinder 26 engages three balls 27, which are confined in the front end of the sleeve 24 by an inturned flange 28 on the latter. The balls 27 are rigidly clamped between the flange 28 and the proximate end of the cylindrical member 26 by action of the threaded plug 25. The three spherical elements 27 therefore form a fixed nesting seat for the test ball 22. As shown in the drawing, the points of contact of the fixed, non-rotatable nesting seat define a circle of lesser diameter than the test ball.

The sleeve 24 is rigidly clamped in the tailstock 23 by a screw 29 which when tightened binds the conically-faced clamping elements 30 against the opposite sides of the sleeve 24 as illustrated in FIGS. 1 and 2. The stationary support provided for the test ball 22 by the balls 27 is a completely stable one in which the test ball is rotated by the rotary chuck 1 acting through the member 8, 9.

The manner in which the electronic testing instrument, shown in part at 34, is applied to the test ball is illustrated in FIG. 2. The instrument comprises a sensitive pickup finger 32 which is held resiliently in contact with the surface of the test ball 22 in a plane normal to the axis $a$—$a$. The instrument comprises in addition to the electronic elements, which form no part of the present invention, a meter dial 33 on which is registered any departure from true sphericity in the test ball. In setting up the test, the stem 8 is retracted against the pressure of the spring 12 to admit a test ball to the seat on the balls 27 and is then released so that the spring may advance the stem with its fingers 19 into the test ball engaging position. The test ball is thereby held rotatably to its stable seat on the three balls 27. The electronic instrument 34 is then placed so that the pickup finger 32 engages the surface of the test ball and the pointer 35 is adjusted to a selected zero point on the dial 33. It will be noted that the stem 8 is free to adjust itself about the center of the spherical end 10 within the bore 7 angularly to a true center line position with respect to the test ball and that the spring 12 does not interfere with such self adjustment. The test ball 22 is rotated on the stationary seat formed by the balls 27, and observation of the meter pointer 35 of the instrument 34 and its movement on the meter dial 33 will show the character and extent of any deviation from true sphericity in the test ball 22. If lubrication is required this may be readily and efficiently effected by insertion between the test ball 22 and the seating balls 27, of a strip of carbon paper designated in the drawings by the reference numeral 36.

In FIG. 3 I have illustrated a stationary seat for the test ball 37 consisting of a fixed block 38 having a spherical recess 39 for reception of the test ball. The radius of the spherical seat does not exceed and is preferably equal to the radius of the test ball, whereby points of contact of the fixed nesting seat define a circle of lesser diameter than the test ball. Lubrication may be effected in this case also by insertion, between the test ball and its seat, of a strip of carbon paper 40. In FIG. 4 the fixed seat for the test test ball 41 consists of a stationary block 42 having a cylindrical recess 43, the radius of the recess being materially less than the radius of the test sphere. The test sphere finds a stable seat on the edges of the recess 43, the points of contact defining a circle of lesser diameter than the test ball. Lubrication may be provided by use of the carbon strip 44 as previously described. FIG. 5 shows a conical seat 46, suitable for several sizes of ball, and adapted to provide points of contact defining a circle of lesser diameter than the test ball.

The invention, as illustrated by the several embodiments described above, resides in the use of a fixed nonrotatable and stable supporting seat for the test ball on which it may be rotated in contact with the highly sensitive instrument, recording or otherwise, without introduction into the reading of error from the machine or other source extraneous to the test ball. In this device it is essential also that the mechanism for transmitting the rotary motion to the test ball be of a character that will not affect or in any way modify the normal stabilized relation between the ball and its said seat. Preferably, the points of contact between the ball and the rotating mechanism define a circle of lesser diameter than the test ball which is diametrically opposite the circle defined by the points of contact of the fixed seat, the common perpendicular center lines thereof coinciding with the axis of rotation.

I claim:

1. In a device for testing balls for spherical accuracy of surface, a stationary seat for the ball defining a circle of lesser diameter than the test ball and forming a fixed stable support on which the ball may rotate, means for rotating the ball against the seat in continuous engagement therewith comprising means to contact the ball defining a circle of lesser diameter than said ball and disposed diametrically opposite the circle defined by said fixed seat, the common perpendicular center lines of said defined circles coinciding with the axis of rotation of said ball, and means for contacting the surface of the ball to indicate differentiations in said surface from true sphericity.

2. A testing device according to claim 1 wherein the said seat consists of three balls and means for rigidly anchoring the balls in fixed stationary positions.

3. A testing device according to claim 1 wherein the seat consists of a spherical socket of radius not exceeding that of the test ball.

4. A testing device according to claim 1 wherein the seat includes a stationary member having a recess, the edge of said recess forming the seat for the ball.

5. A testing device according to claim 1 wherein the seat includes a stationary member having a conical recess for seating the test ball.

6. A testing device according to claim 1 wherein the seat consists of three balls rigidly anchored in fixed stationary position, and the means for rotating the ball against the seat comprises an element for contacting the test ball at three points thereon.

7. In a device for testing balls for spherical accuracy of surface, a stationary seat for the ball comprising at least three contact points defining a circle of lesser diameter than the test ball and jointly forming a fixed stable support on which the ball may rotate, means for rotating the ball against the seat in continuous engagement with said points of contact comprising an element for contacting the ball at a plurality of points defining a circle of lesser diameter than said ball and disposed diametrically opposite the circle defined by the fixed seat, the common perpendicular center lines of said defined circles coinciding with the axis of rotation of said ball, and means for contacting the surface of the ball to indicate differentiations in said surface from true sphericity.

References Cited in the file of this patent

UNITED STATES PATENTS 2,785,474    Mages et al. _____ Mar. 19, 1957

FOREIGN PATENTS 582,636    Great Britain _____ Nov. 22, 1946